Dec. 9, 1924.
H. F. CARDEN
1,518,772
CATTLE GUARD
Filed March 27, 1923
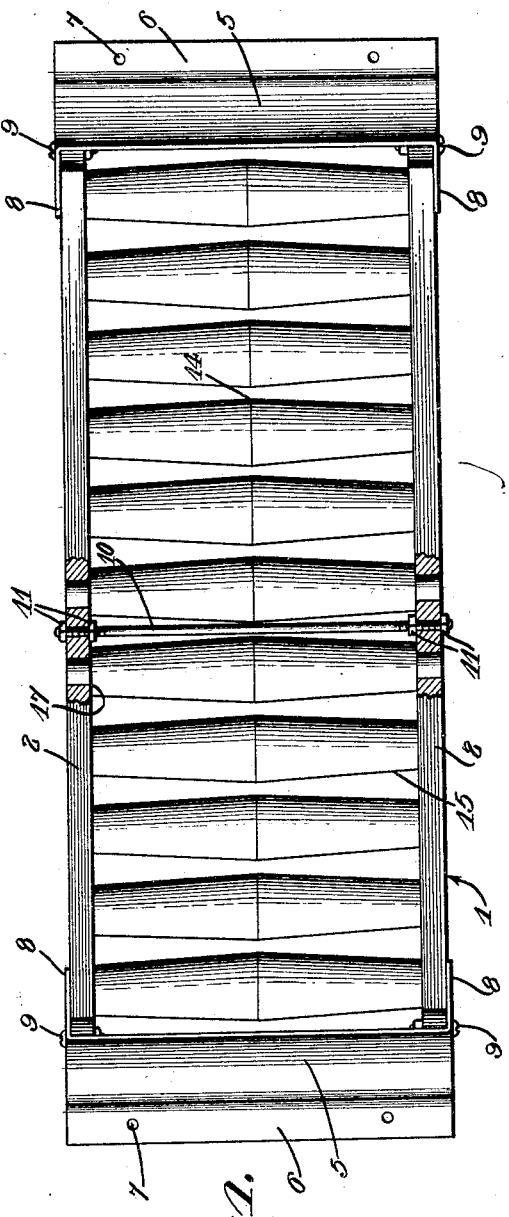
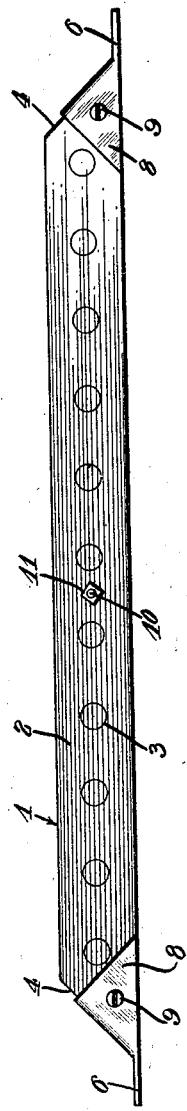
H. F. Carden,
Inventor
By C. A. Snow & Co.
Attorneys Patented Dec. 9, 1924.

1,518,772

UNITED STATES PATENT OFFICE.

HARRY F. CARDEN, OF LAWRENCEBURG, TENNESSEE.

CATTLE GUARD.

Application filed March 27, 1923. Serial No. 628,159.

*To all whom it may concern:*

Be it known that I, HARRY F. CARDEN, a citizen of the United States, residing at Lawrenceburg, in the county of Lawrence and State of Tennessee, have invented a new and useful Cattle Guard, of which the following is a specification.

The device forming the subject matter of this application is a cattle guard, adapted to be placed along a railroad track, and one object of the invention is so to construct the rollers of the cattle guard that the same will present an extremely uneven surface on which animals will forbear to tread.

Another object of the invention is so to construct the rollers that the stub shafts at the ends thereof will not be subject to deterioration.

A further object of the invention is so to construct the frame which carries the rollers that the frame may be adjusted to prevent it from binding on the ends of the rollers.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Figure 2 is a side elevation.

In carrying out the invention, there is provided a frame 1 which may be constructed in any desired way. If preferred, the frame 1 may be made up of side members 2 having openings 3. The ends of the side members 2 are cut off at a bevel, as shown at 4, and incline downwardly and outwardly. End plates 5 rest against the inclined ends 4 of the side members 2 and have outstanding foot plates 6 disposed approximately flush with the lower surface of the side members 2, the foot pieces being supplied with openings 7, adapted to receive securing elements (not shown) whereby the device may be fastened down on the ties of a railroad track or elsewhere. The end plates 5 have flanges 8 overlapped on the outer surfaces of the side members 2 and connected to the side members by securing elements 9, such as bolts. A tie rod 10 extends through the side members 2 of the frame 1 intermediate the ends thereof. Inner nuts 11 are threaded for adjustment on the tie rod 10 and bear upon the inner surfaces of the side members 2. Outer nuts 12 are threaded for adjustment on the tie rod 10 and engage the outer surfaces of the side members 2. Rollers 14 are located within the frame 1 and are tapered on their intermediate portions toward their ends, the rollers terminating in integral stub shafts 16 journaled in the openings 3 of the side members 2 of the frame 1.

The tapering of the rollers 14, indicated at 15, presents a surface which is peculiarly offensive to cattle, there being nothing to support the outer edge of the hoof and the feet of the cattle over-balancing sidewise. Consequently, cattle will not be inclined to attempt to pass over the rollers. The fact that the stub shafts 16 are formed integrally with the rollers 14, instead of being inserted into the ends of the rollers, water cannot find its way into the ends of the rollers and rot them, or cause them to deteriorate otherwise. It is to be observed that the nuts 11 and 12 may be adjusted inwardly and outwardly on the tie rod 10. Owing to this construction, the side members 2 may be bowed slightly, inwardly or outwardly, to prevent them from bearing on the end portions 17 of the rollers 14 and interfering frictionally with the rotation of the rollers. Although the frame 1 may be made of any desired material, the adjustment afforded by the tie rod 10 and the nuts 11 and 12 is of peculiar utility should the side members be made of wood, it being possible to correct any irregularity caused by the warping of the side members 2 and tending to cause the side members to bear on the ends of the rollers.

What is claimed is:—

1. A cattle guard comprising a frame, and rollers journaled in the frame, each roller being tapered from its intermediate portion continuously toward its ends.

2. A cattle guard comprising a frame including side members and end members connecting the side members, rollers having reduced shafts at their ends, the shafts defining shoulders in the rollers, and the shafts being journaled in the side members of the frame; a tie extended across the frame intermediate the ends thereof, and adjusting devices on the tie, the adjusting devices cooperating with the side members of the frame to adjust them outwardly, thereby to prevent the side members from binding on the shoulders of the rollers.

In testimony that I claim the foregoing as my own, I have hereto affixed my signature in the presence of two witnesses.

HARRY F. CARDEN.

Witnesses:
 DIAL HUGHSTON,
 GERTRUDE WILLIAMS.